（12）United States Patent
Watanabe et al.

(10) Patent No.: US 10,303,414 B2
(45) Date of Patent: May 28, 2019

(54) DEVICE, SYSTEM, AND METHOD OF CONTROLLING PROJECTION IMAGE

(71) Applicant: Panasonic Intellectual Property Management Co., Ltd., Osaka-shi, Osaka (JP)

(72) Inventors: Kou Watanabe, Osaka (JP); Masahiko Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/404,145

(22) Filed: Jan. 11, 2017

(65) Prior Publication Data
US 2018/0018139 A1 Jan. 18, 2018

Related U.S. Application Data

(60) Provisional application No. 62/362,601, filed on Jul. 15, 2016.

(51) Int. Cl.
*H04N 7/18* (2006.01)
*G06F 3/14* (2006.01)
(Continued)

(52) U.S. Cl.
CPC ....... *G06F 3/1431* (2013.01); *G02B 26/0833* (2013.01); *G03B 21/28* (2013.01);
(Continued)

(58) Field of Classification Search
CPC ............... H04N 9/3147; H04N 9/3185; H04N 21/41422; H04N 7/18; G06F 3/1431; G08G 5/0021
(Continued)

(56) References Cited

U.S. PATENT DOCUMENTS 6,964,481 B2 * 11/2005 Pho ................ A47C 1/13
353/12
7,097,307 B2 * 8/2006 Lawrence ............ G03B 21/26
352/40
(Continued)

FOREIGN PATENT DOCUMENTS

EP 2876876 A2 5/2015
JP 2004-312480 A 11/2004
(Continued)

OTHER PUBLICATIONS

The partial European Search Report from the corresponding European Patent Application No. 17151597.6 dated Sep. 20, 2017.
(Continued)

*Primary Examiner* — Trang U Tran
(74) *Attorney, Agent, or Firm* — Shinjyu Global IP

(57) ABSTRACT

A server is a projection image control device that can be connected to one or more projectors installed in an aircraft, and comprises a memory and a processor. The memory at least temporarily stores operation information about the aircraft. The projection image control processor determines the display direction of a projection image on the basis of operation information, produces a command to cause the one or more projectors to display a projection image in the determined display direction, and outputs this command.

17 Claims, 13 Drawing Sheets

(51) Int. Cl.
*H04N 9/31* (2006.01)
*G08G 5/00* (2006.01)
*H04N 21/414* (2011.01)
*G02B 26/08* (2006.01)
*G03B 21/28* (2006.01)

(52) U.S. Cl.
CPC ............ *G08G 5/0021* (2013.01); *H04N 9/317* (2013.01); *H04N 9/3147* (2013.01); *H04N 9/3155* (2013.01); *H04N 9/3179* (2013.01); *H04N 9/3182* (2013.01); *H04N 9/3185* (2013.01); *H04N 9/3191* (2013.01); *H04N 21/41422* (2013.01)

(58) Field of Classification Search
USPC ................................. 348/744; 725/75, 76, 77
See application file for complete search history.

(56) References Cited

U.S. PATENT DOCUMENTS

| | | | | |
|---|---|---|---|---|
| 8,639,296 | B2 * | 1/2014 | Ahn .................... | G06F 1/1694 345/173 |
| 8,806,543 | B1 | 8/2014 | Curtis et al. | |
| 9,158,185 | B2 * | 10/2015 | Petrisor ................... | G06F 3/017 |
| 9,341,307 | B2 * | 5/2016 | Seal ...................... | F16M 13/022 |
| 2002/0070944 | A1 | 6/2002 | Deering | |
| 2007/0046901 | A1 | 3/2007 | Kuno | |
| 2012/0019670 | A1 | 1/2012 | Chang et al. | |
| 2012/0069022 | A1 | 3/2012 | Majumder et al. | |
| 2014/0204343 | A1 | 7/2014 | Choi et al. | |
| 2014/0253335 | A1 | 9/2014 | Curtis et al. | |
| 2014/0306862 | A1 * | 10/2014 | Manochio ............. | B64D 43/00 345/1.3 |
| 2016/0264243 | A1 | 9/2016 | Madhav | |

FOREIGN PATENT DOCUMENTS

| | | |
|---|---|---|
| JP | 2014-172604 A | 9/2014 |
| JP | 2014-175011 A | 9/2014 |
| WO | 2015036501 A2 | 3/2015 |

OTHER PUBLICATIONS

The Search Report from the corresponding European Patent Application No. EP17151597.6 dated Feb. 27, 2018.

* cited by examiner

| Operation Status | P30-1 | P30-2 | P30-3 | ... |
|---|---|---|---|---|
| Boarding | Right | Right | Right | |
| In Steady Flight | Front | Front | Rear | |
| Deboarding | Rear | Rear | Front | |

DEVICE, SYSTEM, AND METHOD OF CONTROLLING PROJECTION IMAGE

CROSS-REFERENCE TO RELATED APPLICATIONS

This patent application claims the benefit of U.S. Provisional Patent Application 62/362,601, filed Jul. 15, 2016, the disclosure of which are incorporated herein by reference.

BACKGROUND

Technical Field

The present disclosure relates to a projection image control device, a projection image control system, and a projection image control method, for controlling the display of an image or video projected by a projector or another such image projection device.

Description of the Related Art

Recent years have seen the use of projectors (image projection devices) with which light emitted from a lighting apparatus equipped with an LED (light emitting diode) or another such light source is modulated according to image information or video information to form an optical image, and the optical image thus formed is enlarged and projected onto a screen.

With these devices, it is known that an image or video can be projected onto a screen that consists of a ceiling, a wall, or any of various other kinds of surface in a defined spaced within an aircraft or another means of transportation. The image or video is viewed from many different directions, but the display direction of the projection image or video is predetermined.

SUMMARY

The projection image control device disclosed herein is a projection image control device that can be connected to one or more projectors installed in an interior of a means of transportation, said device comprising a memory and a processor. The memory at least temporarily stores operation information for the means of transportation. The processor determines a display direction of a projection image on the basis of the operation information, produces a command to cause the one or more projectors to display the projection image in the determined display direction, and outputs the command.

The projection image control system disclosed herein comprises the above-mentioned projection image control device and the one or more projectors. The one or more projectors can be connected to the projection image control device, produces the projection image according to the command received from the projection image control device, and projects the projection image in a projection area.

The projection image control method disclosed herein makes use of a control device connected to one or more projectors installed inside a means of transportation, said method including: at least temporarily storing operation information for the means of transportation in a memory; determining a display direction of a projection image on the basis of the operation information, using a processor of the control device; and producing a command to cause the one or more projectors to display the projection image in the determined display direction and transmitting the command to the one or more projectors, using the processor.

The projection image control device, projection image control system, and projection image control method disclosed herein are effective for displaying a projection image in a proper display direction.

BRIEF DESCRIPTION OF DRAWINGS

Referring now to the attached drawings which form a part of this original disclosure:

FIG. 5 shows an example of data to which the projection image control device refers;

DESCRIPTION OF THE INVENTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

In the following description, the term "image" includes the sense of both still pictures and moving pictures, and "image" shall also encompass "video" unless otherwise specified. Also, in the following description, "projection image" encompasses an image or video produced in order to be projected by a projector or another such image projection device. Also, the term "image" is not limited to still and moving pictures, and may also include just text, or a combination of still or moving pictures and text.

Figure 1:
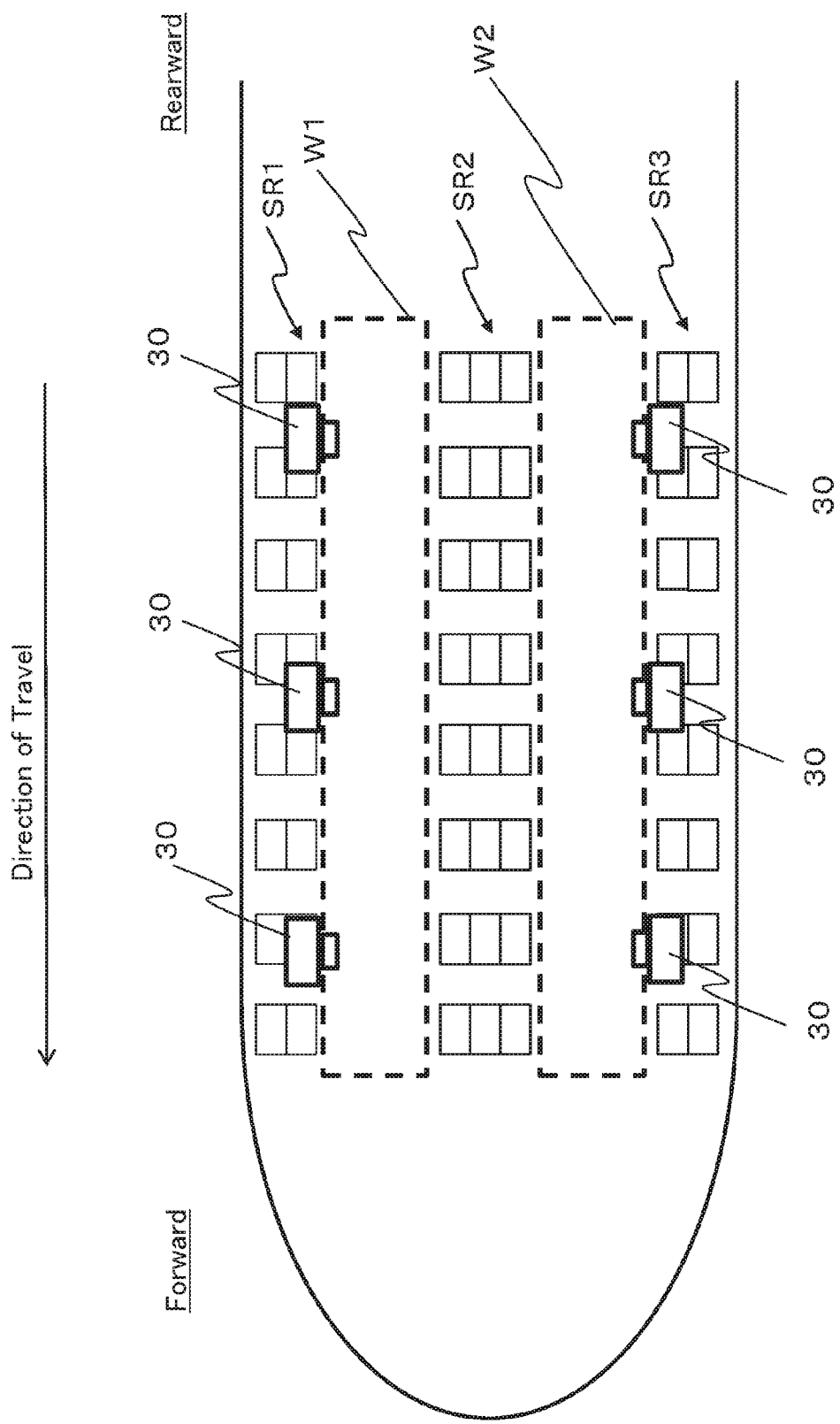
FIG. 1 is a simplified view of an example of the layout of projectors in an aircraft.

FIG. 1 shows an example of the projection image control system disclosed herein, when installed in the passenger compartment of an aircraft. In this disclosure, a plurality of projectors 30 are disposed so as to project an image or video (hereinafter referred to simply as "image") in a projection area that corresponds to a screen and is provided on the ceiling inside an aircraft, for example. In this drawing, the aircraft has a plurality of seat rows SR1, SR2, and SR3 in which passengers sit, which are arranged facing forward in the travel direction of the aircraft, and aisles W1 and W2 are provided in between the seat rows. In this disclosure, the ceiling portions above the aisles W1 and W2 serve as a screen, and the projectors 30 project an image obliquely onto this screen.

Figure 2:
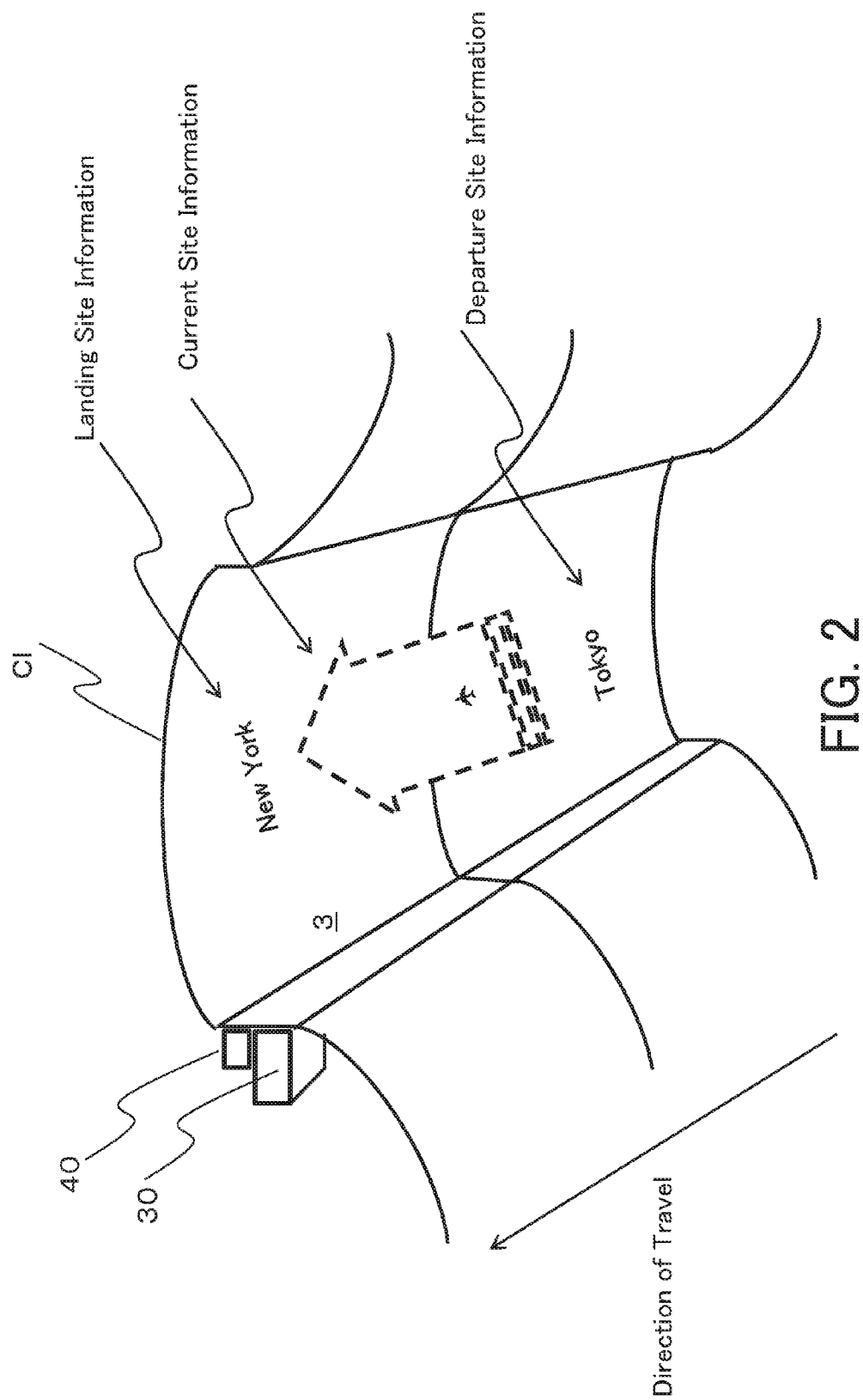
FIG. 2 shows an example of the image projected by the projectors in FIG. 1.

FIG. 2 shows an example of the image projected by the projectors 30 onto the ceiling CL in the passenger compartment of the aircraft. The image here may be one that is produced by the projectors 30 as discussed below. As shown in FIG. 2, LED modules 40 may be provided above the projectors 30. The brightness inside the passenger compartment is controlled by shining light from these LED modules 40 onto the ceiling CL.

The projectors 30 project an image selected on the basis of operation information inputted from an operation system 5 (discussed below) in one or more projection areas 3 on the ceiling CL. The projection areas 3 are surfaces that diffuse and reflect light projected from the projectors 30.

As shown in FIG. 2, for example, starting point information, current location information, and destination information may be displayed in the direction of travel of the aircraft. This information may be displayed as a still picture, a moving picture, text, or a combination of these. Furthermore, the image that is projected on the ceiling CL does not have to be limited to content related to a single area, and content may be produced and projected so that videos related to a plurality of the areas through which the aircraft passes, from the starting point to the destination, are shown simultaneously. In this case, the content image or information related to the area through which the aircraft is passing may be selected from a content server (not shown) on the basis of position information about the aircraft in flight, and may be projected onto the ceiling CL.

Also, the progress of the flight schedule may be projected. It is expected that passenger comfort will be enhanced by notifying them in advance of when the cabin lights are to be extinguished and when food and drink service will be provided, which are events that are shared by all the passengers on a flight.

Embodiment 1 of the present disclosure will now be described.

Embodiment 1

1-1. Configuration 1-1-1. System Configuration

Figure 3:
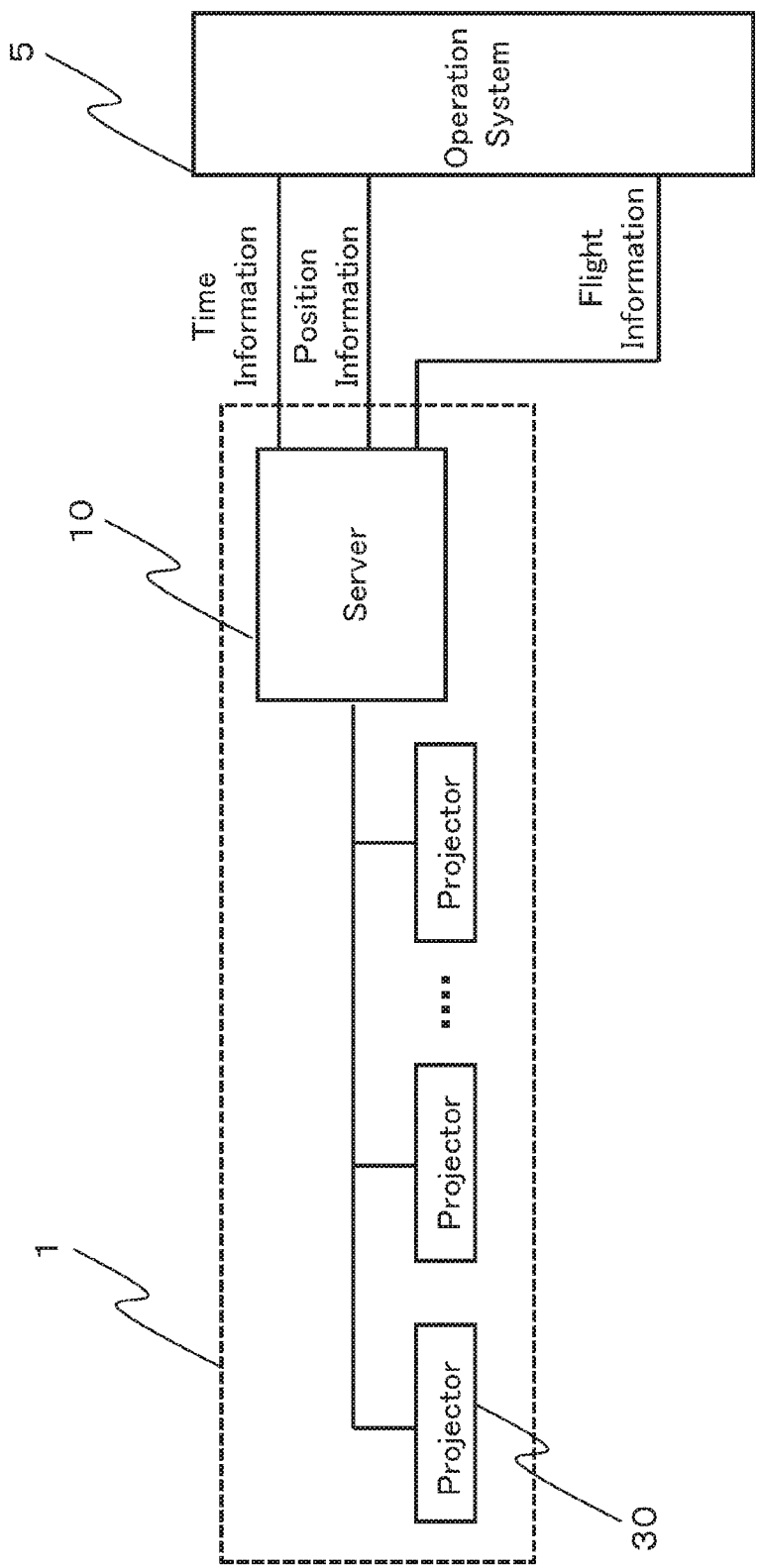
FIG. 3 is a simplified view of the configuration of a system that includes the projection image control device disclosed herein.

FIG. 3 is a simplified view of the overall configuration of the projection image control system 1 in this embodiment. The projection image control system 1 comprises a server 10 and a plurality of projectors 30 connected to the server 10. The server 10 is connected to the operation system 5. The operation system 5 acquires flight information including the aircraft flight schedule, the operation status, and so forth, and transmits this information to the server 10. From the operation system 5, the server 10 acquires the longitude and latitude of an in-flight or parked aircraft as location information, as well as the current time of day as time information.

1-1-2. Server Configuration

Figure 4:
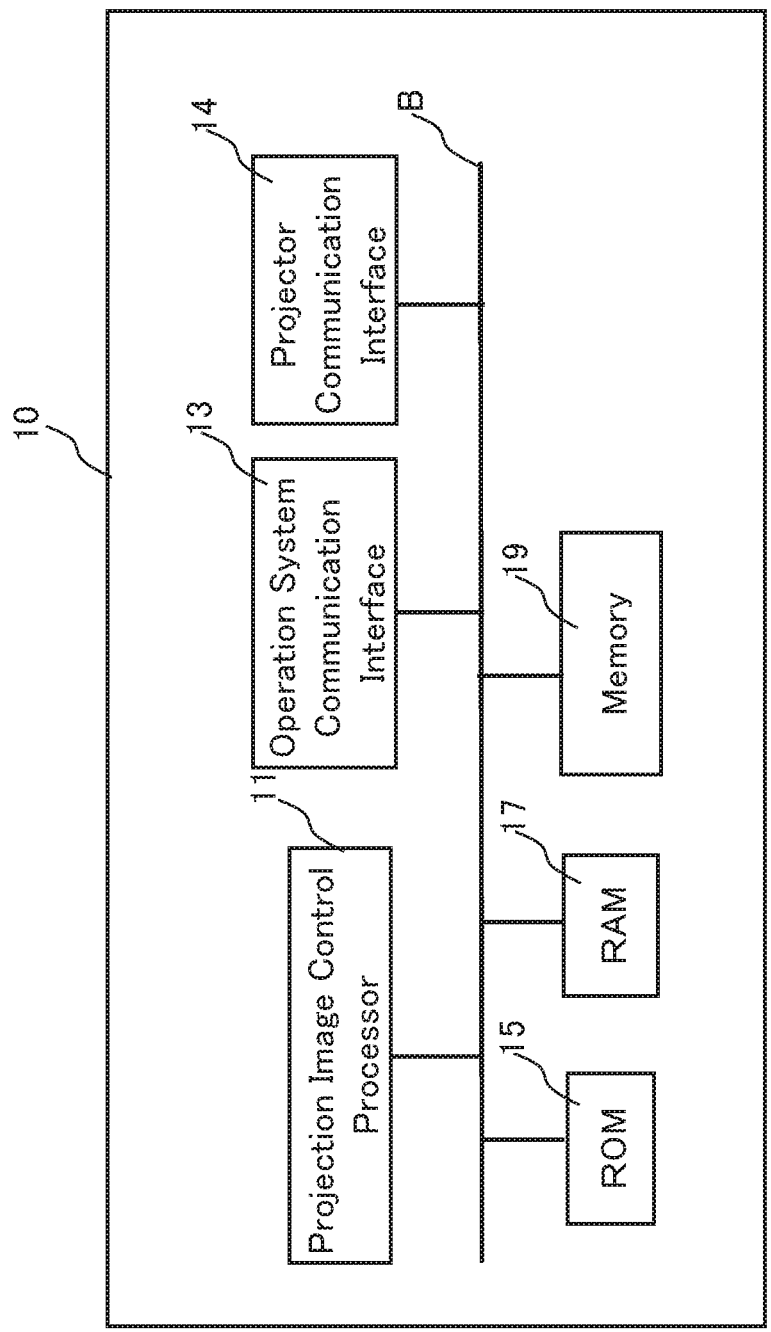
FIG. 4 is a simplified view of the configuration of the projection image control device disclosed herein.

FIG. 4 is a simplified view of the configuration of the server 10 (an example of a projection image control device) pertaining to this embodiment. The server 10 is a computer device that transmits image projection commands (discussed below) to the connected projectors 30, and comprises a projection image control processor 11 (an example of a processor) such as a CPU, a memory 19 (an example of a memory), an operation system communication interface 13, a projector communication interface 14, a ROM 15, and a RAM 17 (an example of a memory), which are connected by a bus B.

The projection image control processor 11 includes a circuit that executes programs that it reads, thereby performing data computation and control. The projection image control processor 11 executes processing to determine the display direction of the projection image according to operation information from the operation system 5 (time information, position information, flight information, etc.), to produce a command to display the projection image in the determined display direction, and to transmit this command to the projectors 30.

The operation system communication interface 13 is a communication circuit or a connection that allows wired or wireless communication with the operation system 5. The projector communication interface 14 is a communication circuit or a connection that allows wired or wireless communication with the projectors 30.

The ROM 15 holds programs executed by the projection image control processor 11, or fixed data serving as computation parameters. The RAM 17 is used as a storage area or a working area for programs executed in the processing done by the projection image control processor 11, and for parameters that change as needed in program processing.

The memory 19 is a semiconductor memory, a magnetic disk, or the like, and stores data processed by the projection image control processor 11 or programs. As shown in FIG. 5, the memory 19 holds determination data 191 for determining the display direction of the images projected by the projectors 30 (30-1, 30-2, 30-3, . . . ) according to the operation status determined by the projection image control processor 11 on the basis of information from the operation system 5. The determination data 191 includes, for example, information indicating the display direction of the projectors 30 corresponding to the operation status. In this example, the projectors 30-1 and 30-2 project a single image, as in the examples shown in FIGS. 9 and 11 (discussed below).

1-1-3. Projector Configuration

Figure 6:
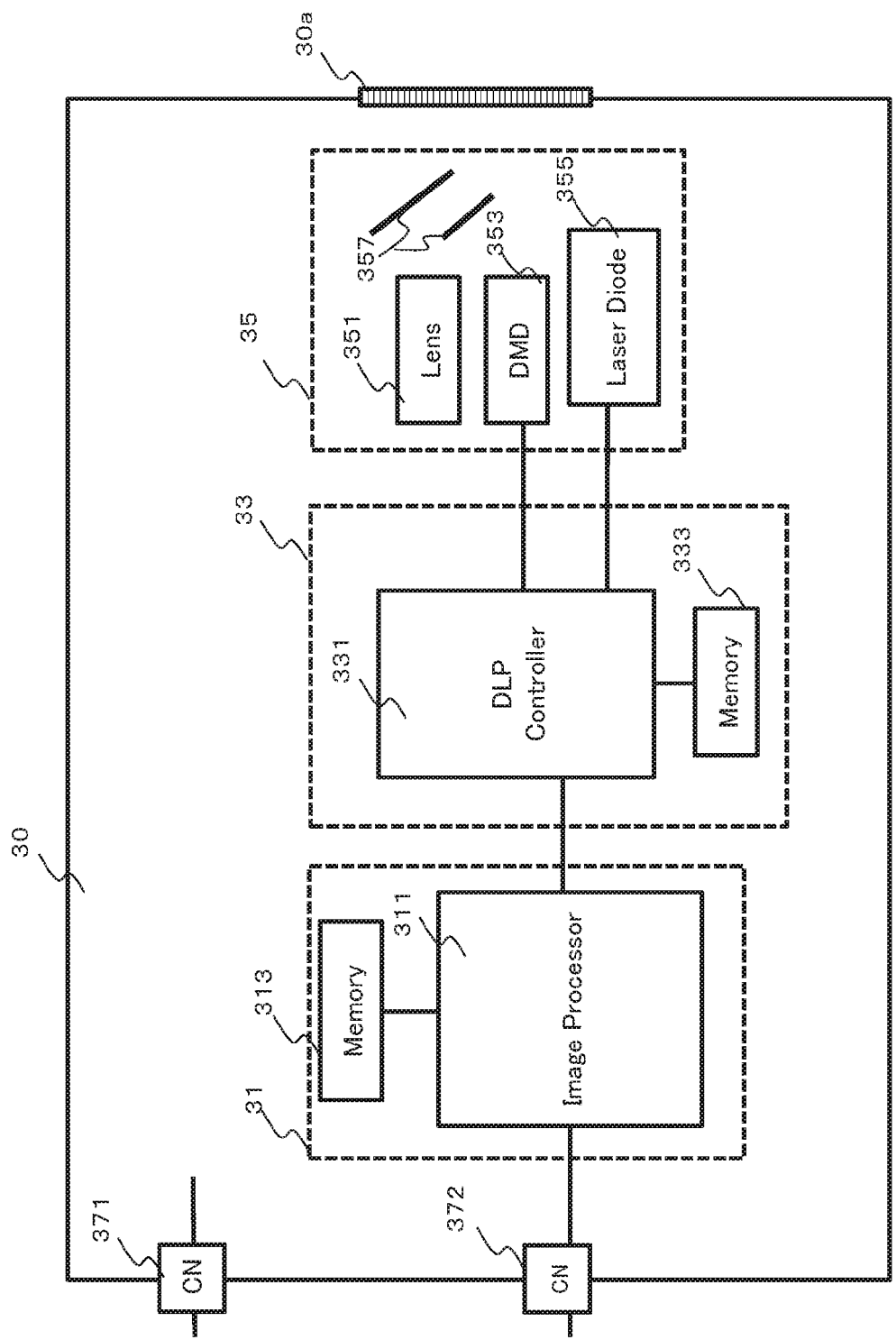
FIG. 6 is a simplified view of the configuration of the projector disclosed herein.

FIG. 6 is a simplified view of the configuration of the projector 30 pertaining to this embodiment (an example of a projector). The projectors 30 project image light into the projection areas 3 (FIG. 2) provided to the ceiling CL, on the basis of analog or digital image data supplied from the server 10, a separately provided content server (not shown), or another such image supply device. The projectors 30 may read image data stored in a built-in memory (not shown) or in an externally connected memory medium, and project image light into the projection areas 3 (FIG. 2) on the basis of this image data.

As shown in FIG. 6, the projectors 30 each mainly comprise an image processing unit 31, an optical control unit 33 (an example of an optical controller), and an optical unit 35. The projectors 30 also comprise a connection 371 such as a DC terminal for receiving an input from a direct current power supply or an AC terminal for receiving an input from an alternating current power supply, and a network connection 372 such as the Ethernet (registered trademark).

The image processing unit 31 includes an image processor 311 and a memory 313. The image processor 311 extracts inputted image data into the memory 313, and executes image processing on the extracted image data. This image processing includes, for example, processing to determine whether an image is a 3D (stereoscopic) image or a 2D (flat) image, resolution conversion processing, frame rate conversion processing, distortion correction processing, digital zoom processing, color correction processing, brightness correction processing, or the like. The image processor 311 also reads the image-processed image data from the memory 313, produce R, G, and B image signals corresponding to this image data, and output the result to the optical control unit 33. The memory 313 is made up of one or more memories, and includes ROM (read-only memory), RAM (random access memory), and so forth. The memory 313 includes a working memory for temporarily storing image data and programs.

The optical control unit 33 includes a DLP (digital light processing) controller 331 and a memory 333. The DLP controller 331 is a processor or a circuit that controls a DMD (digital micro-mirror device) 353 or a laser diode 355 of the optical unit 35 according to the image signal inputted from the image processing unit 31. The DLP controller 331 executes display control over the DMD 353, rotation control over a color wheel (not shown), emission control over the laser diode 355, and so on. The memory 333 includes a working memory for temporarily storing image signals and programs.

The optical unit 35 comprises a lens system 351, a DMD 353, a laser diode 355, and a mirror 357. The lens system 351 is made up of a plurality of lens groups disposed along the optical axis, such as a lens that enlarges the image light and projects it into the projection area 3 (FIG. 2), and a zoom lens that enlarges and reduces a projection image, and adjusts the focus of the projection image. The lens system 351 guides the image light formed by the DMD 353 to the mirror 357, and this light is reflected by the mirror 357. The mirror 357 comprises two mirrors, for example, one of which reflects light emitted from the lens system 351 and guides it to the other mirror, where the light is then reflected by this second mirror, goes through a protective glass (not shown) provided in a projection opening 30a, and is projected obliquely onto the ceiling CL. The DMD 353 is a light modulation element in which numerous movable micro-mirrors are arranged two-dimensionally on an integrated circuit. The DMD (light modulation element) 353 modulates light emitted from the laser diode 355 by means of the mirror elements on the surface, and emits the light to the lens system 351. The DMD 353 also forms image light by modulating the light on the basis of the inputted image signal. The laser diode 355 is the light source for the projector 30, and shines light at the DMD 353.

Information from Operation System

Information from the operation system 5 includes time information, information about the position of the aircraft, flight information (the operation schedule, operation status, and so forth), etc. The projection image control processor 11 of the server 10, for example, acquires information indicating the operation status from the operation system 5, or determines the operation status from the time information, aircraft position information, operation schedule, and so forth obtained from the operation system 5, and determines on the display direction or the content of the projection image according to the operation status thus acquired or determined.

The operation status includes the following information, for example.

when the aircraft is stopped before departure
during passenger boarding
when passengers have all taken their seats
when outside doors have been closed
during taxiing prior to takeoff
while safety video is playing
when safety video has ended
when all flight attendants are seated
during takeoff
during steady flying
when seatbelt sign has been turned off
before and after window shades are closed
when IFE (in-flight entertainment) become available
just before a meal
just after a meal
just before beverage service
when lavatory is in use
when lavatory is vacant
when lights are out
when IFE is not available
during landing
during taxiing after landing
when the aircraft is stopped after landing
when outside doors are open
while passengers are deboarding The operation system 5 may be such that the above-mentioned operation status is ascertained via automatic detection or crew input, for example.

1-2. Operation

Figure 7:
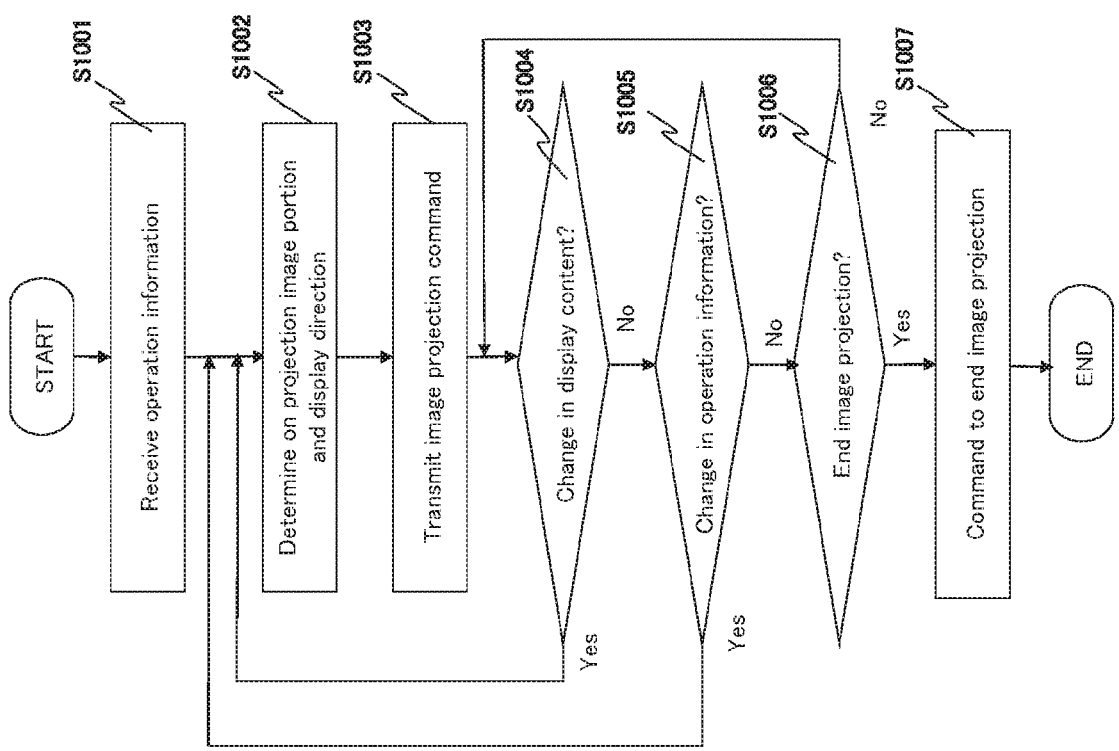
FIG. 7 is a flowchart of the operation of the projection image control device pertaining to Embodiment 1.

FIG. 7 shows the operation for controlling a projection image, which is executed mainly by the projection image control processor 11 of the server 10.

S1001: The projection image control processor 11 receives information from the operation system 5 via the operation system communication interface 13. The received information is at least temporarily stored in the memory 19, the RAM 17, etc.

S1002: The projection image control processor 11 refers to the determination data 191 shown in FIG. 5, and determines on the content and the display direction of the images projected by the projectors 30, according to the information received from the operation system 5.

For example, the images IM1 and IM2 shown in FIG. 9 (discussed below) are display examples of when the aircraft is in flight (during steady flying). The projection image control processor 11 determines that the aircraft is in steady flight from the above-mentioned flight information, time information, and position information obtained from the operation system 5, and determines the display direction of the images IM1 and IM2 shown in FIG. 9.

The content of the images may be acquired from a content server provided to the system, for example. In this embodiment, as discussed above, since a single content image is projected by the projectors 30-1 and 30-2, the ranges of the images projected by the projectors 30 are also determined and a corresponding command issued.

S1003: The projection image control processor 11 produces an image projection command, and transmits the command through the projector communication interface 14 to the projectors 30. The image projection command includes the image portion that is the range of image projected by the projectors 30 (coordinate information, etc.), as well as the display direction thereof.

S1004: If there is a change in the content, the projection image control processor 11 goes back to step S1002 and again determines on the projection image portion and the display direction. Otherwise, the flow proceeds to step S1005.

S1005: If there is a change in the operation information that is received, the projection image control processor 11 goes back to step S1002 and again decides on the projection image portion and the display direction. Otherwise, the flow proceeds to step S1006.

S1006: Unless the projection of the content image is finished, the projection image control processor 11 repeats the above processing. Once the projection of the content image is finished, the flow proceeds to step S1007.

S1007: The projection image control processor 11 instructs the projectors 30 to end their projection of the content image.

Figure 8:
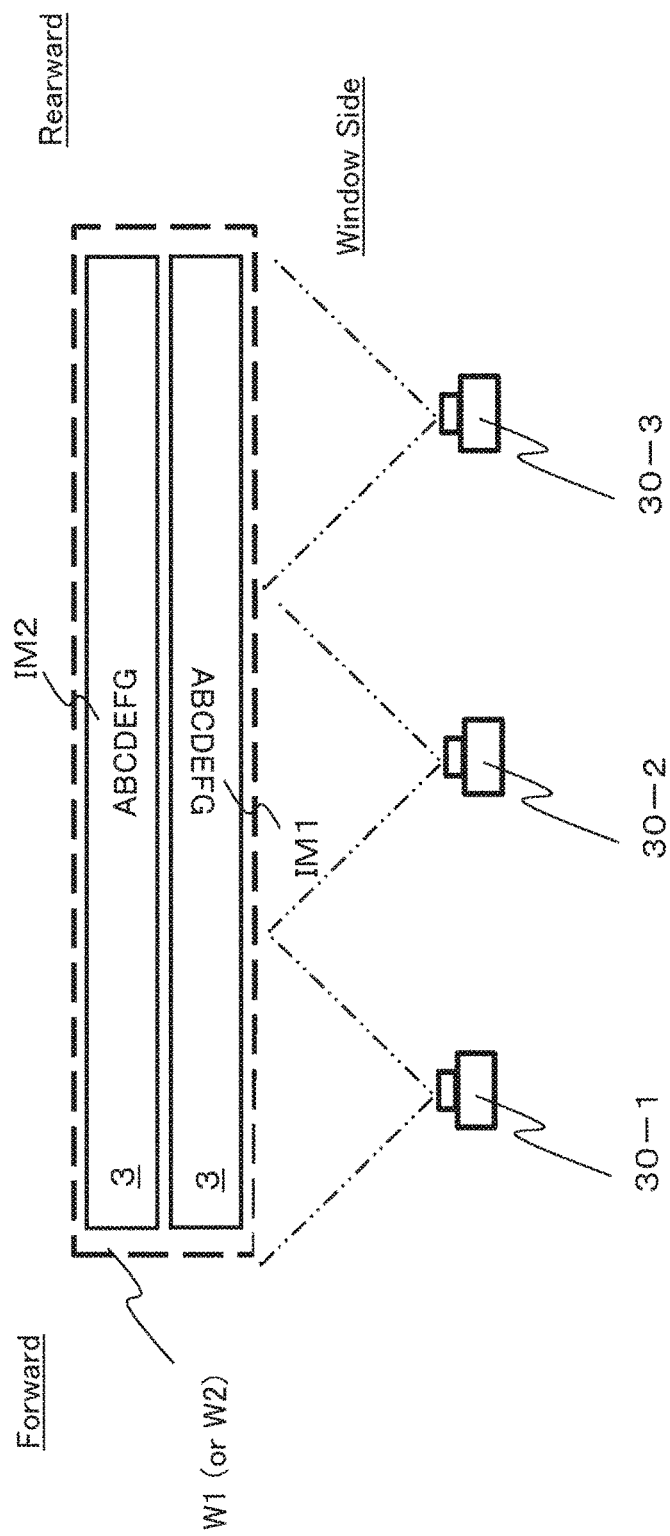
FIG. 8 shows an example of the display of an image outputted as the result of the operation of the projection image control device pertaining to Embodiment 1.

FIG. 8 shows an example of an image projected into the projection areas 3 on the ceiling CL above the aisle W1 (or W2) by the projectors 30-1, 30-2, and 30-3 as a result of the above-mentioned projection image control. In this drawing, an example is given of an image that is displayed while the passengers are boarding. The orientation or display direction of the image is determined on according to information from the operation system 5.

In a situation in which passengers are more apt to look up at the ceiling CL above the aisle W1 (or W2) to check seat locations, such as during passenger boarding, it is determined from the information obtained from the operation system 5 that boarding is in progress, the projection area 3 along the aisle W1 (or W2) is divided up, and the image is projected as the images IM1 and IM2, which are inverted vertically in the drawing. The images IM1 and IM2 include, for example, information indicating the seat row numbers. A display such as this allows video to be provided right-side up to passengers no matter whether they look toward the window side of the aisle W1 (or W2) or on the opposite side. Vertical inversion is not limited to inversion in point symmetry of 180 degrees with respect to the center point in the drawing, as in FIG. 8, and may instead be inversion in line symmetry that is mirror-inverted with respect to the center line in the up and down direction in the drawing.

Figure 9:
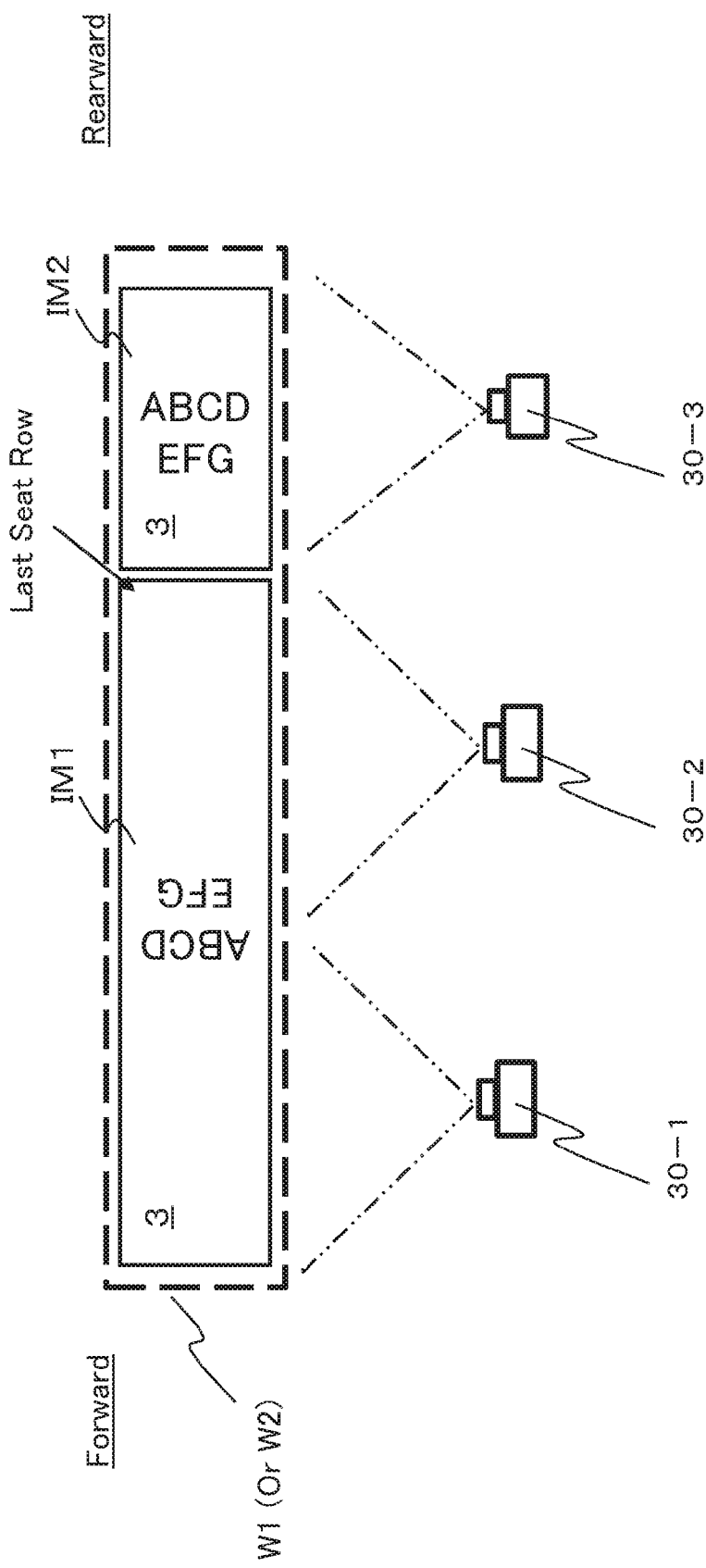
FIG. 9 shows an example of the display of an image outputted as the result of the operation of the projection image control device pertaining to Embodiment 1.

If it has been determined, on the basis of the information from the operation system 5, that the operation status is that steady flight is in progress, the orientation of the displayed image (the text) may be changed according to the place where the image is projected, as shown in FIG. 9. During a flight, when the passengers are seated, the content video is displayed so that its orientation faces the direction of travel of the aircraft. Consequently, the image IM1 looks natural to passengers sitting in their seats. On the other hand, in the projection area 3 behind the last row of seats, the video cannot be seen by passengers sitting in their seats, and it is a frequent occurrence that a passenger in the aisle who is heading for the lavatory will see the video, for example. Therefore, the image IM2 is displayed in the opposite direction from that of the image IM1 (to the rear). This means that the image IM2 will look natural to a passenger who is moving down the aisle from the front toward the rear.

1-3. Features, etc.

In the above embodiment, the server 10 can be connected to the one or more projectors 30 installed inside an aircraft, and comprises the memory 19 or the RAM 17 that at least temporarily stores operation information about the aircraft, and the projection image control processor 11. The projection image control processor 11 determines the display direction of the projection image on the basis of operation information, produces a command to display the projection image in the determined display direction, and outputs this command to the one or more projectors 30.

The server 10 serving as the projection image control device in the above embodiment automatically determines on the display direction of the projection image according to operation information, and consequently, when onboard passengers are seated, moving down the aisle, etc., an image can be displayed in a direction that makes it easy for the passengers to see, depending on their situation.

Embodiment 2

The projection image control system pertaining to Embodiment 2 will now be described.

The components, functions, operations, and so forth that are the same as in Embodiment 1 above will numbered and depicted in the drawings in the same way, and will not be described or depicted again.

2-1. Configuration

The projection image control system, server, and projector pertaining to Embodiment 2 are the same as the projection image control system 1 (FIG. 3), the server 10 (FIG. 4), and the projector 30 (FIG. 6) pertaining to Embodiment 1, and will therefore not be described again.

2-2. Operation

Figure 10:
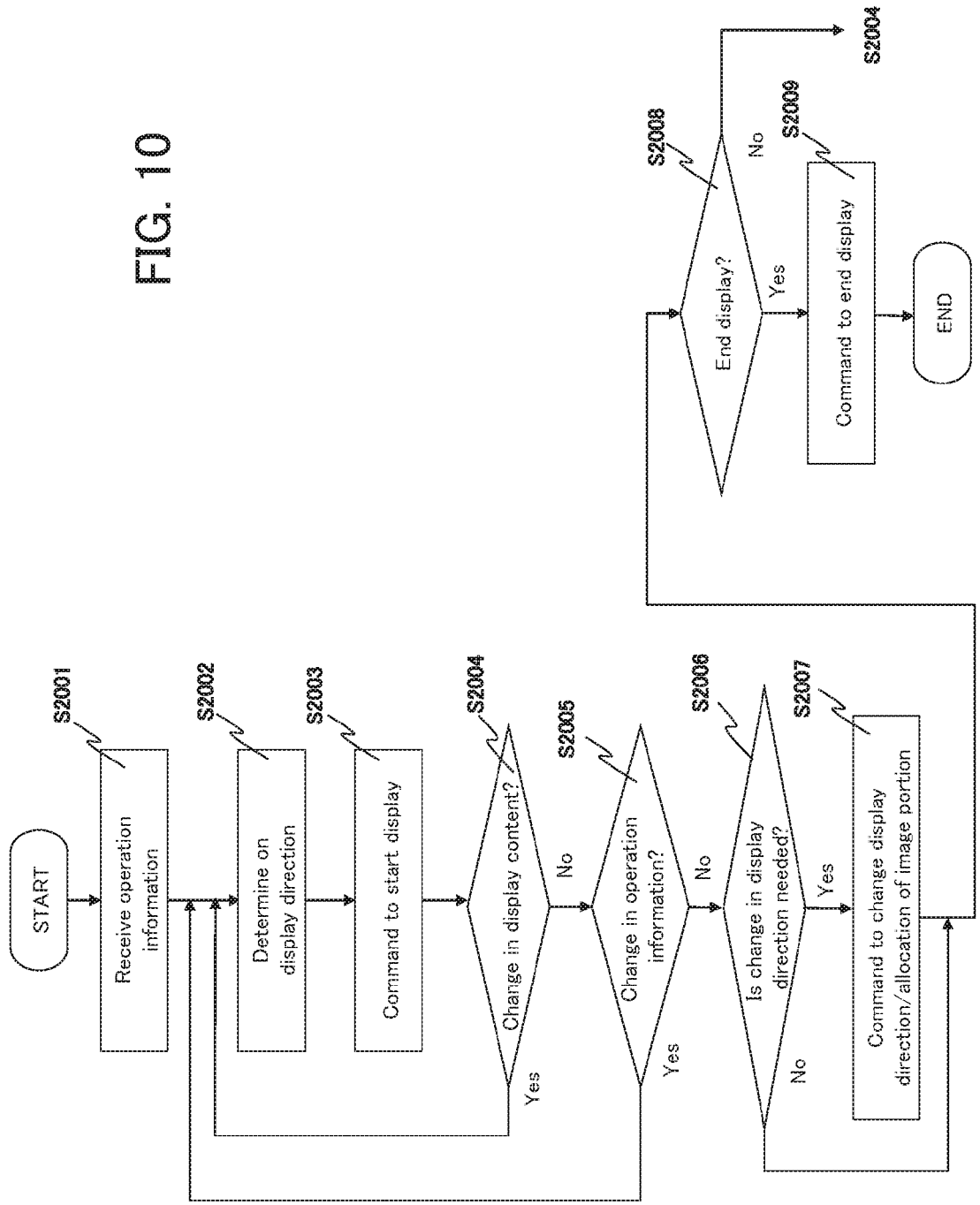
FIG. 10 is a flowchart of the operation of the projection image control device pertaining to Embodiment 2.

FIG. 10 shows the projection image control operation executed mainly by the projection image control processor 11 of the server 10.

S2001: Just as in Embodiment 1, the projection image control processor 11 receives information from the operation system 5 via the operation system communication interface 13. The received information is at least temporarily stored in the memory 19, the RAM 17, etc.

S2002: Just as in Embodiment 1, the projection image control processor 11 determines on the content and the display direction of the images projected by the projectors 30, according to the information received from the operation system 5.

S2003: Just as in Embodiment 1, the projection image control processor 11 produces an image projection command, and transmits the command through the projector communication interface 14 to the projectors 30.

S2004: If there is a change in the content, the projection image control processor 11 goes back to step S2002 and again determines on the projection image portion and the display direction. Otherwise, the flow proceeds to step S2005.

S2005: Just as in Embodiment 1, if there is a change in the operation information that is received, the projection image control processor 11 goes back to step S2002 and again determines on the projection image portion and the display direction. Otherwise, the flow proceeds to step S2006.

S2006: The projection image control processor 11 determines whether or not to change the display direction of the image currently being displayed, according to the received flight information, time information, position information, etc. This determination processing is carried out on the basis of predetermined conditions.

Figure 11:
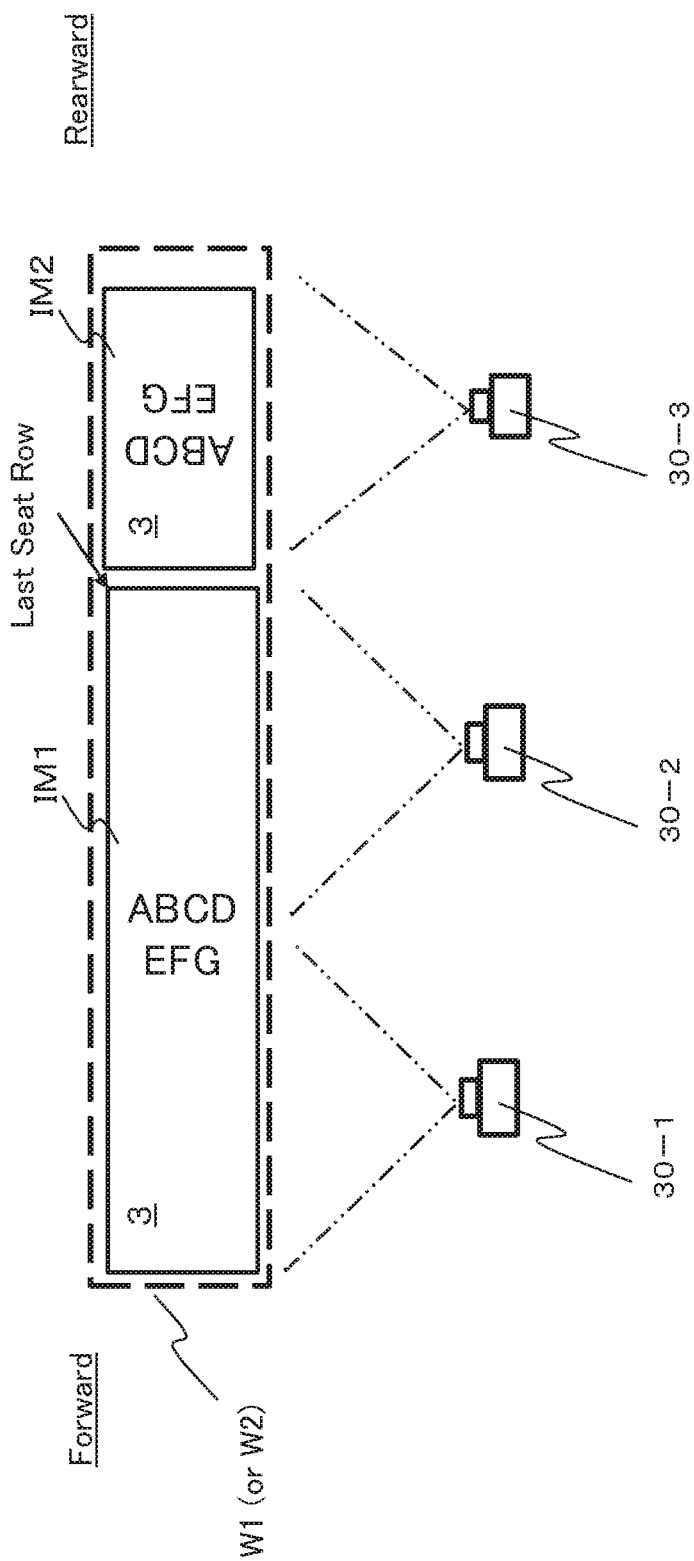
FIG. 11 shows an example of the display of an image outputted as the result of the operation of the projection image control device pertaining to Embodiment 2.

For example, the above-mentioned images IM1 and IM2 shown in FIG. 9 indicate the display state when the aircraft is flying (in steady flight). The projection image control processor 11 determines that the aircraft is in a passenger deboarding state from the flight information, time information, position information, and so forth newly received from the operation system 5. In this case, the projection image control processor 11 refers to the determination data 191 (FIG. 5) and changes the display direction of the projection images IM1 and IM2 as shown in FIG. 11. This change in the display direction allows passengers who are moving toward the rear for the purpose of deboarding to see the image in a display direction that is easy to read.

S2007: The projection image control processor 11 produces a command to change the display direction of the image currently being projected. The projection image control processor 11 also specifies the image portion that is the range (coordinate information) of the image projected by the projectors 30 that will be changed along with the display direction. The display direction change command also includes information about the changed image portions allocated to the projectors 30.

Figure 12:
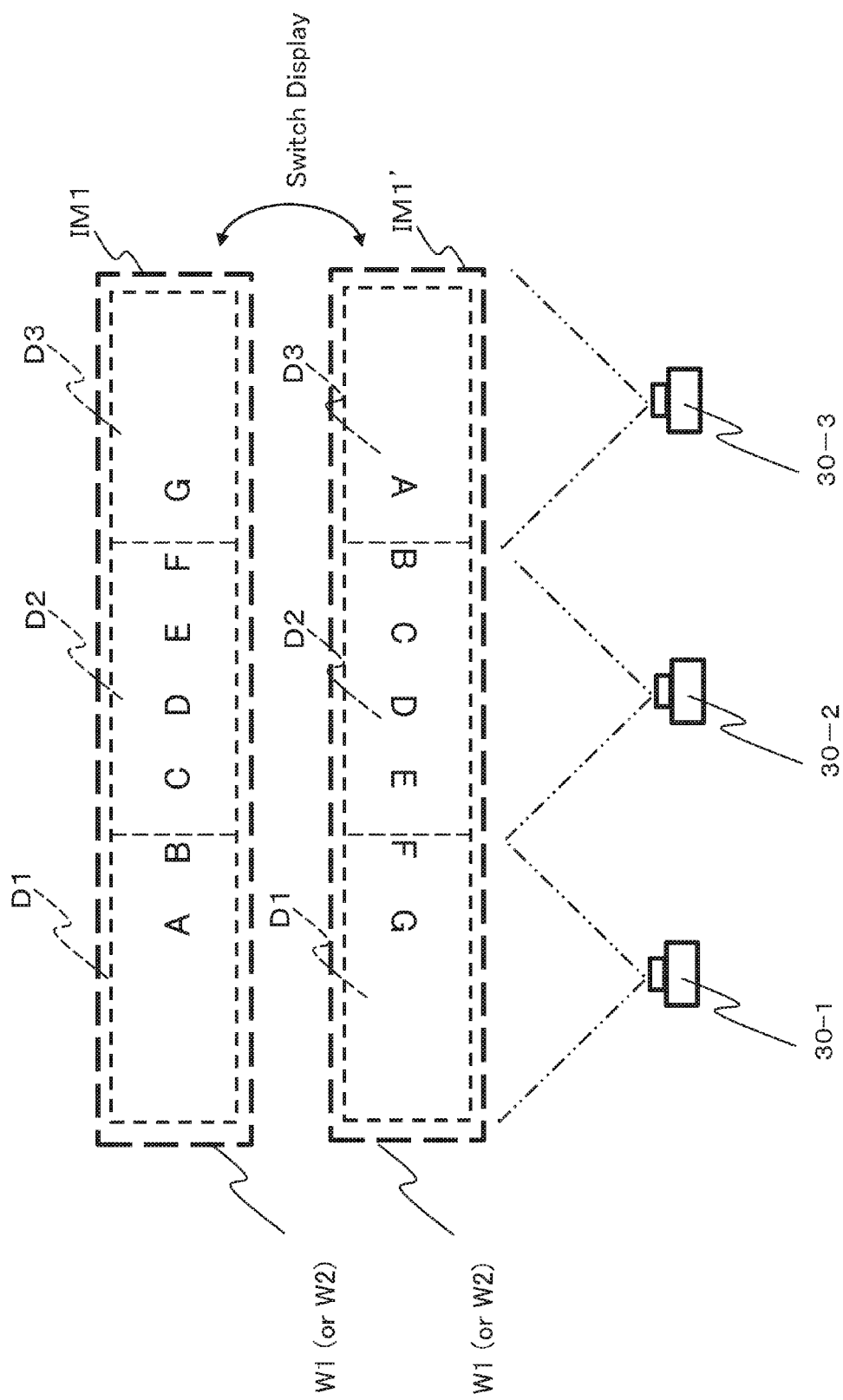
FIG. 12 shows another example of the display of an image outputted as the result of the operation of the projection image control device pertaining to Embodiment 2.

For example, as shown in FIG. 12, when the display direction of the projection image is changed from IM1 to IM1', the content of the image portions D1, D2, and D3 allocated to be projected by the projectors 30-1, 30-2, and 30-3 is different between IM1 and IM1'. Therefore, the display change command produced by the projection image control processor 11 also includes information specifying the image portions after the change (such as coordinate information).

S2008: The projection image control processor 11 repeats the above processing until the projection of the content image is finished. Once the projection of the content image is finished, the flow proceeds to step S2009.

S2009: The projection image control processor 11 sends each of the projectors 30 a command to stop projecting the content image.

2-3. Features, Etc.

In the above embodiment, in addition to the features of Embodiment 1, the projection image control processor 11 of the server 10 produces and outputs a command to change the display direction of the projection image to one or more projectors on the basis of operation information.

Therefore, the display direction of the projection image can be automatically changed according to operation information, so an image can be displayed in a direction that is easy for the passengers to see, according to their situation.

Other Embodiments

Embodiments 1 and 2 were described above as examples of the technology disclosed herein. However, the technology disclosed herein is not limited to or by these, and can also be applied to embodiments with modifications, substitutions, additions, omissions, and so forth made as needed. Also, the various constituent elements and functions described in the Embodiments 1 and 2 can be combined to create new embodiments.

In view of this, the following examples are given as other embodiments.

(1)

In the above embodiments, when the display direction of the projection image is changed, this may be a change in the display direction of just the image, a change in the display direction of just the text, or a change in the display direction of both the image and the text in the projection image.

Also, the display direction of the projection image need not change merely according to the operation status, etc., and may also be changed at certain time intervals. For instance, the display of IM1 and IM1' shown in FIG. 12 may be switched at certain time intervals.

Also, as discussed above, a single projection image is displayed by a plurality of the projectors 30 (FIGS. 8, 9, 11, and 12). Since the passengers view this at an angle to the side from their seats, they can enjoy a panoramic image that is projected onto a large screen that is wider than it is tall.

(2)

Figure 13:
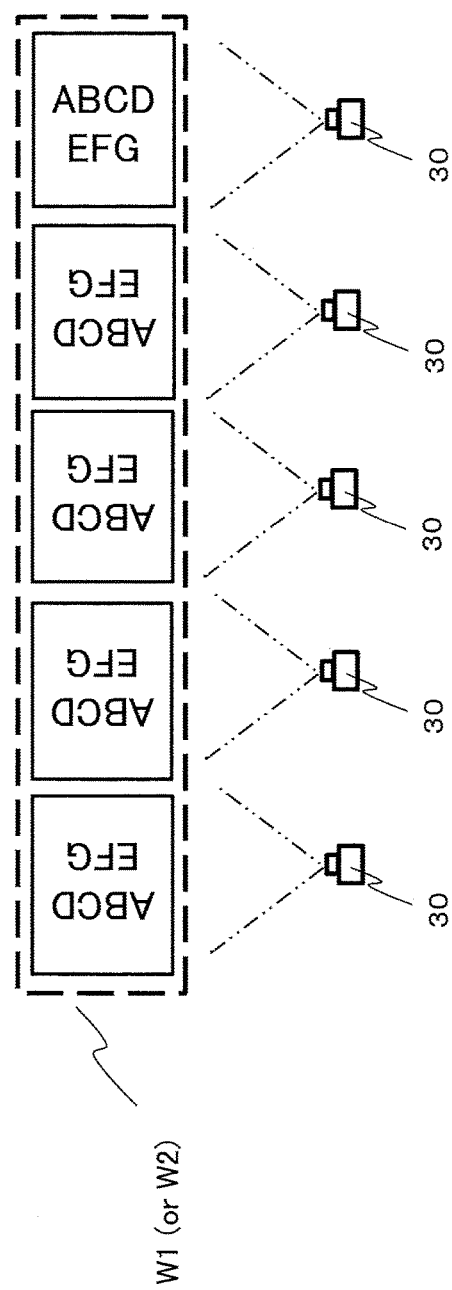
FIG. 13 shows an example of the display of an image outputted as the result of the operation of the projection image control device pertaining to another embodiment.

In the above embodiments, a single projection image was displayed by a plurality of the projectors 30, but this is not the only option. As shown in FIG. 13, a single image may be projected by a single projector 30. For instance, in a situation in which passengers are looking up at the ceiling from the aisle W1 (or W2), this direction and screen configuration will allow the passengers to see the image more easily.

(3)

In the above embodiments, the number of projectors 30 connected to the server 10 is not limited to what was given in the example, and may be more or less than what was given.

The projection image control system 1 disclosed herein may also comprise just one projector 30. In this case, the projection image control device comprising the projection image control processor 11 and the memory 19 may be installed inside the projector 30.

(4)

In the above embodiments, the content image that was projected was acquired from a content server onboard the aircraft, but that is not the only option. The content may be television video broadcast from a satellite or acquired over the Internet from outside the aircraft through the wireless communication system of the aircraft, and the content may be changed at regular time intervals during flight or according to the area through which the aircraft is passing.

(5)

Some or all of the processing functions of the projection image control processor 11 pertaining to the above embodiments may be executed, for example, by the control circuit of a CPU (central processing unit) (or an MPU (microprocessing unit), an MCU (micro-controller unit), or another such microcomputer). Also, some or all of the various processing functions may be executed by a program that is analyzed and executed by a CPU (or an MPU, an MCU, or another such microcomputer), or by hardware using wired logic. Also, the memory 19 may, for example, be formed by a RAM (random access memory), a flash memory, or another such semiconductor memory element or other memory device.

The projection image control processor 11 may be constituted by one or more processors or circuits. Also, the projection image control processor 11 may be constituted by one or more semiconductor chips.

(6)

The programs for executing the operation of the projection image control processor 11 pertaining to the above embodiments may be stored ahead of time in the ROM 15, the memory 19, etc., or may be stored in the storage unit of another computer device and acquired via a network connection 372.

(7)

The order in which the operations of the projection image control processor 11 pertaining to the above embodiments (FIGS. 7 and 10) are executed is not necessarily limited to what was stated in the above embodiments, and the execution order can be switched around without departing from the gist of the invention.

(8)

The projection image control system 1 pertaining to the above embodiments is not limited to the given example of being used in an aircraft. For instance, it may be used on a train, a ship, or some other such means of transportation, or may be used in a facility or the like.

(9)

A DLP projector was used as an example of the projectors 30 pertaining to the above embodiments, but this is not the only option, and other types of projector may be used instead, such as a CRT type, an LCD type, or an LCoS (liquid crystal on silicon) type.

(10)

The light source in the projectors 30 pertaining to the above embodiments may be a high-pressure mercury lamp, a halogen lamp, a metal halide lamp, or some other such lamp, or an LED (light emitting diode) or other such light source.

(11)

The projector 30 pertaining to the above embodiments may be equipped with an internal camera. In this case, the camera acquires coordinate information about the projection areas 3, or is used for determining the focus of the projection image, for projection mapping, or the like. The camera is disposed at a location where it will not block the projected light.

(12)

The present disclosure is not limited to being worked in the mode of the server 10. The scope of the present disclosure encompasses a semiconductor chip that includes the projection image control processor 11, a projection image control method or computer program that is executed by the projection image control processor 11, and a recording medium that can be read by a computer and on which the program is recorded. Examples of computer-readable recording media include a flexible disk, hard disk, CD-ROM, MO, DVD, DVD-ROM, DVD-RAM, BD (Blu-ray (registered trademark) Disc), SSD, and semiconductor memory.

The above-mentioned computer program is not limited to one that is recorded on the above-mentioned recording medium, and may be one that is transmitted over an electrical communication line, a wired or wireless communication line, or a network such as the Internet.

(13)

The projectors 30 pertaining to the above embodiments are not limited to being disposed on any particular seat row side, and may be disposed on the seat rows on both sides of the aisle, and may shine light onto the ceiling CL from both sides.

What is claimed:

1. A projection image control device that can be connected to one or more projectors installed in an interior of a means of transportation and for projection on a projection surface parallel to a direction of the means for transportation, said device comprising:
   a memory configured to at least temporarily store operation information for the means of transportation; and
   a processor configured to determine an orientation of content of a projection image on the projection surface on the basis of the operation information, wherein
   the processor produces and outputs a first command to cause the one or more projectors to change the determined orientation of the content of the projection image on the projection surface to a first direction along a forward moving direction of the means of transportation and a second direction perpendicular to the first direction on the projection surface on the basis of the operation information,
   the projection image includes a plurality of content regions,
   the processor produces and outputs a second command to cause the one or more projectors to display the content of the projection image so that the plurality of content regions are aligned in the first direction when the means of transportation is moving, and
   the processor produces and outputs a third command to cause the one or more projectors to display the content of the projection image so that the plurality of content regions are aligned in the second direction during passenger boarding of the means of transportation.

2. The projection image control device according to claim 1, wherein the projection image control device can be connected to a plurality of the one or more projectors that project a single projection image, and the second or third command includes information specifying an image portion to be projected by each of the plurality of the one or more projectors for the single projection image.

3. The projection image control device according to claim 1, wherein the operation information includes at least one of the following: time information, information about the position of the means of transportation, and information indicating an operation schedule and operation status for the means of transportation.

4. The projection image control device according to claim 3, wherein
   the processor
      determines the operation status of the means of transportation on the basis of at least one of the following: the time information, the information about the position of the means of transportation, and the operation schedule, and
      determines or changes the orientation of the content of the projection image according to the operation status that has been determined.

5. The projection image control device according to claim 3, comprising
   a memory that holds data including a correlation between the operation status and the orientation of the content of the projection image, wherein the processor produces the first command by referring to the data.

6. The projection image control device according to claim 4, further comprising
   a memory that holds data including a correlation between the operation status and the orientation of the content of the projection image, wherein the processor produces the first command by referring to the data.

7. The projection image control device according to claim 1, wherein the projection image includes at least one of the following: a still picture, a moving picture, and text information, and the first command includes a command to determine or change the orientation of content of one or more of the still picture, the moving picture, and the text information.

8. The projection image control device according to claim 1, wherein the first command includes a command to display the projection image while switching to a different display direction at specific time intervals.

9. The projection image control device according to claim 1, wherein the operation information includes at least one of the following: time information, information about the position of the means of transportation, and information indicating an operation schedule and operation status for the means of transportation,
   wherein the processor
      determines a moving state or a stop state of the means of transportation on the basis of the operation status determined on the basis of at least one of the following: the time information, the information about the position of the means of transportation, the operation schedule, or the information indicating the operation status,
      determines or changes the orientation of the content of the projection image so as to display the content of the projection image in the first direction when the means of transportation is moving, and
      determines or changes the orientation of the content of the projection image so as to display the content of the projection image in the second direction during passenger boarding of the means of transportation.

10. The projection image control device according to claim 9, wherein the processor determines or changes the orientation of the content of the projection image so as to display the content of the projection image in the first direction during passenger deboarding of the means of transportation.

11. The projection image control device according to claim 1, wherein the processor produces and outputs a command to cause the one or more projectors to change a position of the projection image projected on the projection surface.

12. The projection image control device according to claim 1, wherein orientations of content of each of the plurality of content regions are different.

13. The projection image control device according to claim 12, wherein the orientations of the contents of each of the plurality of content regions are reversed with each other with respect to a boundary of the plurality of content regions.

14. A projection image control system, comprising:
projection image control device according to claim 1; and
the one or more projectors that can be connected to the projection image control device, produce the projection image according to the second or third command received from the projection image control device, and project the projection image into a projection area.

15. The projection image control system according to claim 14, wherein the one or more projectors produce the projection image that includes a first image portion indicating information related to a starting point of the means of transportation, and a second image portion indicating information related to a destination of the means of transportation, and project the projection image in the projection area so that the second image portion is located ahead of the first image portion in a forward direction of the means of transportation.

16. The projection image control system according to claim 14, wherein the one or more projectors are disposed so as to project the projection image obliquely with respect to the projection area.

17. A projection image control method that makes use of a control device connected to one or more projectors installed in an interior of a means of transportation and for projection on a projection surface parallel to a direction of the means for transportation, said method including:

at least temporarily storing operation information for the means of transportation in a memory;

determining an orientation of content of a projection image on the projection surface on the basis of the operation information, using a processor of the control device;

producing and outputting a first command to cause the one or more projectors to change the determined orientation of the content of the projection image on the projection surface to a first direction along a forward moving direction of the means of transportation and a second direction perpendicular to the first direction on the projection surface on the basis of the operation information, wherein the projection image includes a plurality of content regions;

outputting a second command to cause the one or more projectors to display the content of the projection image so that the plurality of content regions are aligned in the first direction when the means of transportation is moving; and outputting a third command to cause the one or more projectors to display the content of the projection image so that the plurality of content regions are aligned in the second direction during passenger boarding of the means of transportation.

* * * * *